US012603667B2

(12) United States Patent
Zhu et al.

(10) Patent No.: US 12,603,667 B2
(45) Date of Patent: Apr. 14, 2026

(54) METHOD AND APPARATUS FOR DETECTING AND CORRECTING PASSIVE INTERMODULATION (PIM)

(71) Applicant: TELEFONAKTIEBOLAGET LM ERICSSON (PUBL), Stockholm (SE)

(72) Inventors: Zhongwen Zhu, Saint-Laurent (CA); Manoj Kopparambil Nambiar, New Westminster (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 18/556,426

(22) PCT Filed: May 4, 2021

(86) PCT No.: PCT/IB2021/053743
§ 371 (c)(1),
(2) Date: Oct. 20, 2023

(87) PCT Pub. No.: WO2022/234321
PCT Pub. Date: Nov. 10, 2022

(65) Prior Publication Data
US 2025/0088208 A1    Mar. 13, 2025

(51) Int. Cl.
*H04B 1/10*        (2006.01)

(52) U.S. Cl.
CPC ................................. *H04B 1/1027* (2013.01)

(58) Field of Classification Search
CPC .................................................. H04B 1/1027
USPC .......................................................... 375/346
See application file for complete search history.

(56) References Cited

U.S. PATENT DOCUMENTS

| | | | |
|---|---|---|---|
| 9,768,812 B1 | 9/2017 | Tsui et al. | |
| 10,601,456 B2 | 3/2020 | Tsui | |
| 2018/0248572 A1* | 8/2018 | Ishikawa | .............. H04B 1/0475 |
| 2019/0280732 A1* | 9/2019 | Moon | ...................... H04B 7/14 |
| 2022/0263588 A1* | 8/2022 | Fleischer | ............. H04B 1/1036 |

FOREIGN PATENT DOCUMENTS

| | | |
|---|---|---|
| WO | 2017072552 A1 | 10/2015 |
| WO | 2019203704 A1 | 10/2019 |
| WO | 2020208400 A1 | 10/2020 |

OTHER PUBLICATIONS

Christopher Stockman, "Reducing PIM on cell site towers in the 5G er" https://www.rcrwireless.com/20200724/wireless/reducing-pim-on-cell-towers-in-the-5g-era-reader-forum.
Introduction to PIM (Passive Intermodulation) https://www.anritsu.com/en-us/test-measurement/technologies/pim.
(Continued)

*Primary Examiner* — Lihong Yu
(74) *Attorney, Agent, or Firm* — Julie Dufort; Ericsson Canada Inc.

(57) ABSTRACT

The disclosure relates to a method, apparatus and computer readable media, for detecting and correcting passive intermodulation (PIM). The method comprises receiving a radio frequency (RF) signal. The method comprises providing the RF signal to a first and a second PIM detectors. The method comprises, upon detection of PIM by at least one of the first and second PIM detectors, for which, based on a schedule, the detection of PIM is applicable at a time of detection of PIM, activating PIM correction.

20 Claims, 10 Drawing Sheets

(56) References Cited

OTHER PUBLICATIONS

Muhammad Zeeshan et al, "Digital Cancellation of Passive Intermodulation in FDD Transceivers", arXiv:1812.03655v1 2018 https://arxiv.org/pdf/1812.03655.pdf.
International Search Report and Written Opinion for International Patent Application No. PCT/ib2021/053743 Jan. 31, 2022, 10 pages.

* cited by examiner

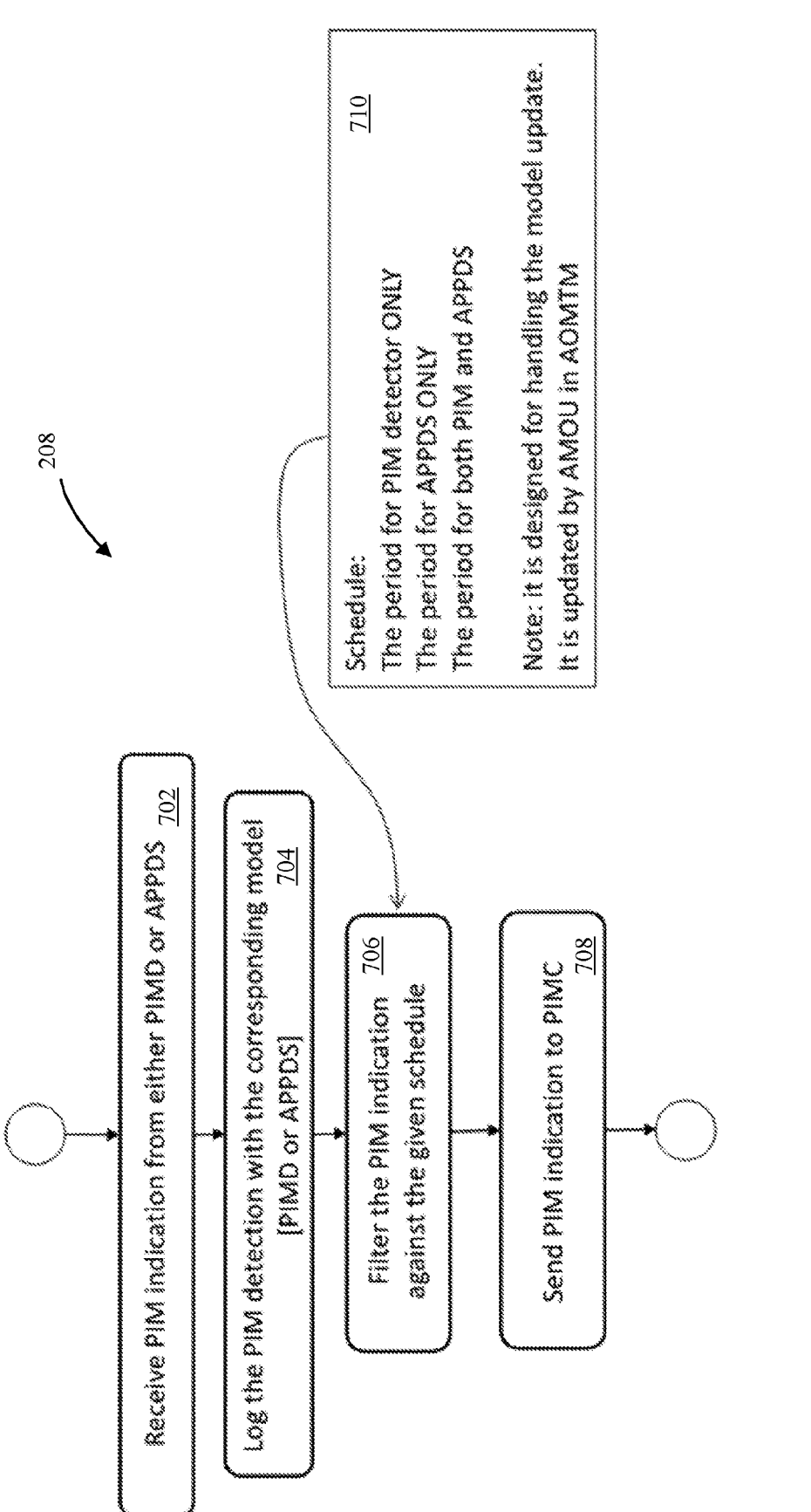

208

Receive PIM indication from either PIMD or APPDS    702

Log the PIM detection with the corresponding model [PIMD or APPDS]    704

Filter the PIM indication against the given schedule    706

Send PIM indication to PIMC    708

710

Schedule:
The period for PIM detector ONLY
The period for APPDS ONLY
The period for both PIM and APPDS Note: it is designed for handling the model update.
It is updated by AMOU in AOMTM

Figure 7

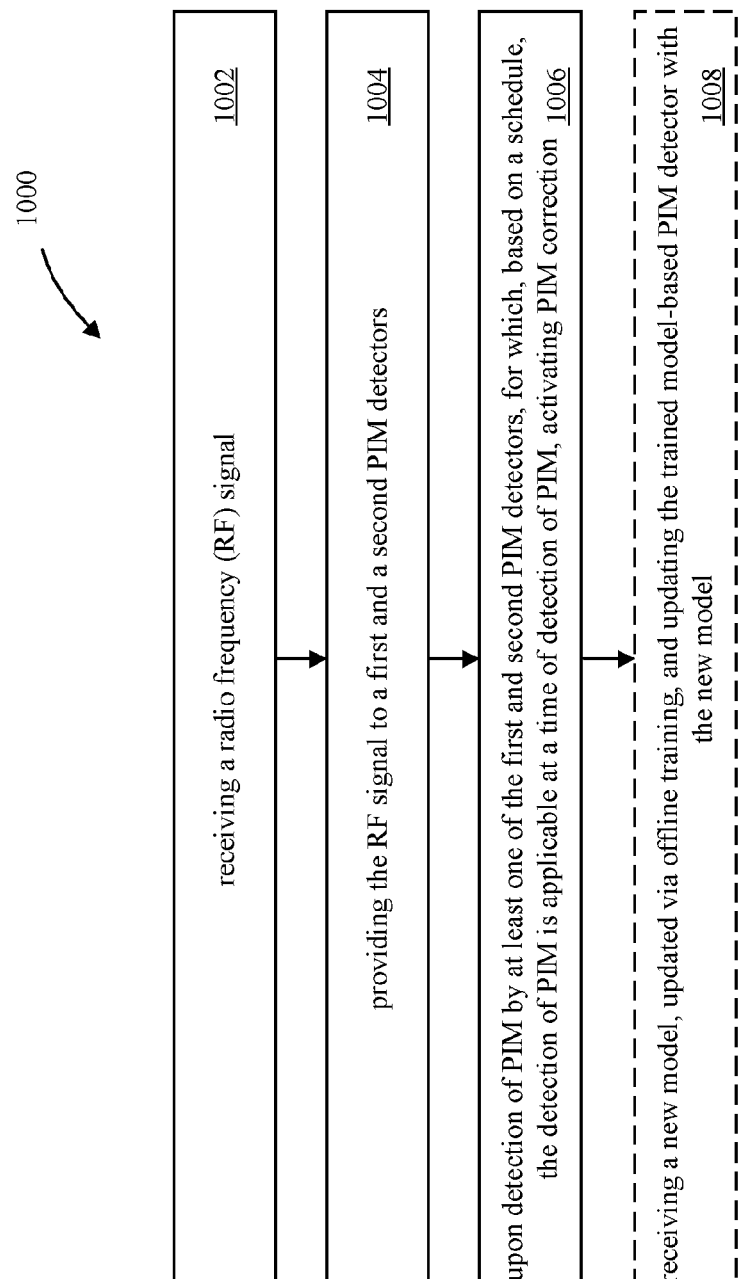

1000 receiving a radio frequency (RF) signal          1002 providing the RF signal to a first and a second PIM detectors          1004 upon detection of PIM by at least one of the first and second PIM detectors, for which, based on a schedule, the detection of PIM is applicable at a time of detection of PIM, activating PIM correction          1006 receiving a new model, updated via offline training, and updating the trained model-based PIM detector with the new model          1008

Figure 10

METHOD AND APPARATUS FOR DETECTING AND CORRECTING PASSIVE INTERMODULATION (PIM)

TECHNICAL FIELD

The present disclosure relates to passive intermodulation detection and correction.

BACKGROUND

Passive intermodulation (PIM) is a form of signal interference, and it can be caused either by metal components or by two or more carriers that share the same downlink (DL) path in a wireless network.

PIM is a growing issue for cellular network operators. PIM issues may occur as existing equipment ages, when co-locating new carriers, or when installing new equipment. PIM is a particular issue when overlaying (duplexing) new carriers into old antenna runs.

PIM has become even more of a challenge with the introduction of the new fifth generation (5G) technology and infrastructure. Having collocated technologies can cause interference and can significantly deteriorate network capacity and coverage. In fact, according to prevailing estimates, a drop of 1 decibel (dB) in uplink sensitivity due to PIM can reduce wireless coverage by up to 11 percent in a macro network. Unsurprisingly, mobile operators have made reducing PIM on cell sites one of their top priorities as they roll out 5G networks.

In order to reduce or control the PIM impact in radio sites, several technologies for PIM cancellation have been proposed and implemented in the past through either hardware focus, such as using the composite materials instead of metallic materials, or software focus, using algorithms for PIM cancellation.

The success of applying PIM cancellation in real time traffic (such as in the multiple carriers' cases) has to rely on an algorithmic approach due to the dynamic non-linearity characteristics of PIM occurrence. But to make PIM cancellation algorithms work, it requires to detect PIM accurately, efficiently and quickly.

Ericsson patent application WO2017/072552 (included herein by reference in its entirety) describes a method and system for detecting PIM signals in a wireless communication base station.

An overview of such a system is provided in FIG. 1, in which the broadband antenna receives all the signals from different antennas as well as other PIM sources, such as metallic materials. The PIM detection system picks the signals and does the analysis, then decide if PIM occurred or not. The output of the PIM detection system is given to the PIM cancellation algorithm to reduce the PIM impact on the corresponding radio site. FIG. 1 presents a block diagram of an example wireless communication system 20, which includes a base station 17 having a radio 12a and antenna 13a. The system 20 further includes wireless devices 14, a network 16 and at least one PIM source 18. The base station 17 also includes a broadband antenna 22 and a PIM detection system 24. The PIM detection system 24 receives—via broadband antenna(s) 22—signals from internal radio 12a via antennas 13, from a transmitter 33 of an external radio 12c and from the PIM source 18. Radio 1, 12a transmits on the downlink at least at a first DL frequency F1 and radio 2, 12c transmits on the downlink at least at a second DL frequency F2. These downlink signals interact with the PIM source 18, which generates PIM signals that are received by the broadband antenna 23 along with F1 and F2.

The PIM detection system 24 scans a wideband of frequencies to detect the DL signal frequencies F1 and F2. Based on these frequencies, the PIM detection system 24 computes PIM frequencies at which PIM signals may exist. The PIM detection system 24 processes a sample of a signal at a calculated PIM frequency and a sample of the received radio frequency, compare an output from the processing to a threshold to determine whether a PIM signal is present. The results of the determination that PIM exists at PIM frequencies may be conveyed to a remote location via the network 16. Once the PIM detection system 24 detects the presence of PIM at PIM frequencies, at least one of the radios 12 may determine if the PIM frequencies at which PIM is detected is at or near an uplink signal frequency channel. If so, then steps may be taken to reduce the PIM.

Ericsson patent application WO2019/203704 (included herein by reference in its entirety) describes a method and system for determining whether a target cell has experienced interference due to Passive Intermodulation (PIM) distinguished from other forms of interference at cellular network sites during a time window.

SUMMARY

There is provided a method for detecting and correcting passive intermodulation (PIM). The method comprises receiving a radio frequency (RF) signal. The method comprises providing the RF signal to a first and a second PIM detectors. The method comprises, upon detection of PIM by at least one of the first and second PIM detectors, for which, based on a schedule, the detection of PIM is applicable at a time of detection of PIM, activating PIM correction.

Referring again to FIG. 2, there is provided an apparatus for detecting and correcting passive intermodulation (PIM). The apparatus comprises processing circuits and a memory, the memory containing instructions executable by the processing circuits whereby the apparatus is operative to receive a radio frequency (RF) signal. The apparatus is operative to provide the RF signal to a first and a second PIM detectors. The apparatus is operative, upon detection of PIM by at least one of the first and second PIM detectors, for which, based on a schedule, the detection of PIM is applicable at a time of detection of PIM, to activate PIM correction.

There is provided a non-transitory computer readable media having stored thereon instructions for detecting and correcting passive intermodulation (PIM). The instructions comprise receiving a radio frequency (RF) signal. The instructions comprise providing the RF signal to a first and a second PIM detectors. The instructions comprise, upon detection of PIM by at least one of the first and second PIM detectors, for which, based on a schedule, the detection of PIM is applicable at a time of detection of PIM, activating PIM correction.

The methods and apparatuses or base stations provided herein present improvements to the way methods, apparatuses or base stations operate.

BRIEF DESCRIPTION OF THE DRAWINGS

FIG. 7 is a flowchart illustrating the logics of the generic interference determiner.

FIG. 10 is a flowchart of a method for detecting and correcting passive intermodulation (PIM).

DETAILED DESCRIPTION

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

The rapid advance of artificial intelligence (AI) and machine learning (ML) technologies in recent years, can be leveraged for PIM detection. PIM detection can be realized using an intelligent model built based on deep neural network and providing more accuracy and more efficiency than traditional systems. Further, the model can be continuously improved by collecting more data from radio site, which can be used to continuously train the model.

To transition from the traditional static PIM detection model based on static algorithms towards a dynamic neural network based trained model, efforts are needed for defining the model but also for defining a framework that can facilitate the transition in commercial products, such as fifth generation (5G)/Beyond 5G radio base station.

A new intelligent PIM detection system or framework is provided herein to address the issues highlighted previously.

Figure 1:
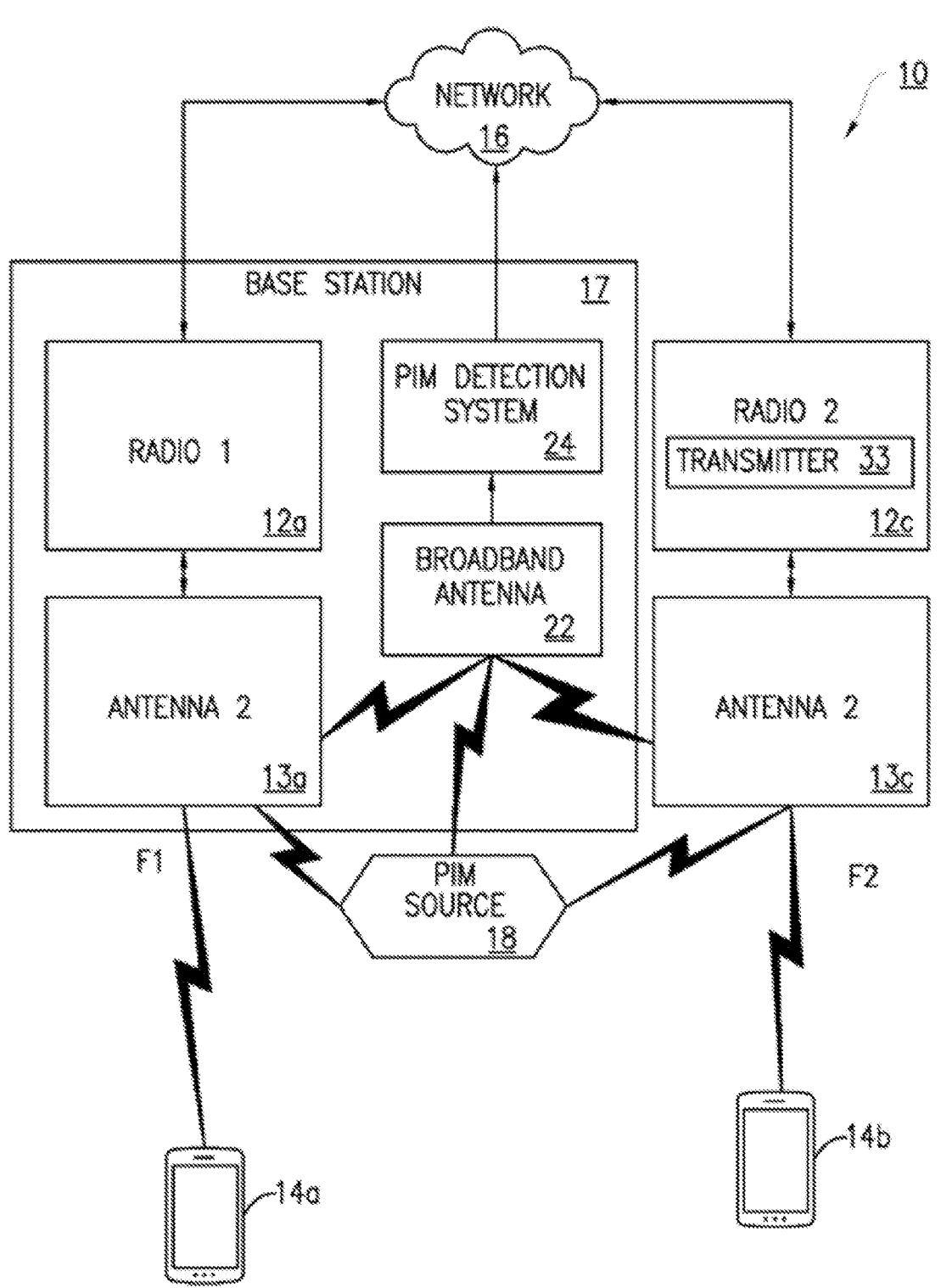
FIG. 1 is a schematic illustration of a passive intermodulation (PIM) system of the prior art.
Figure 2:
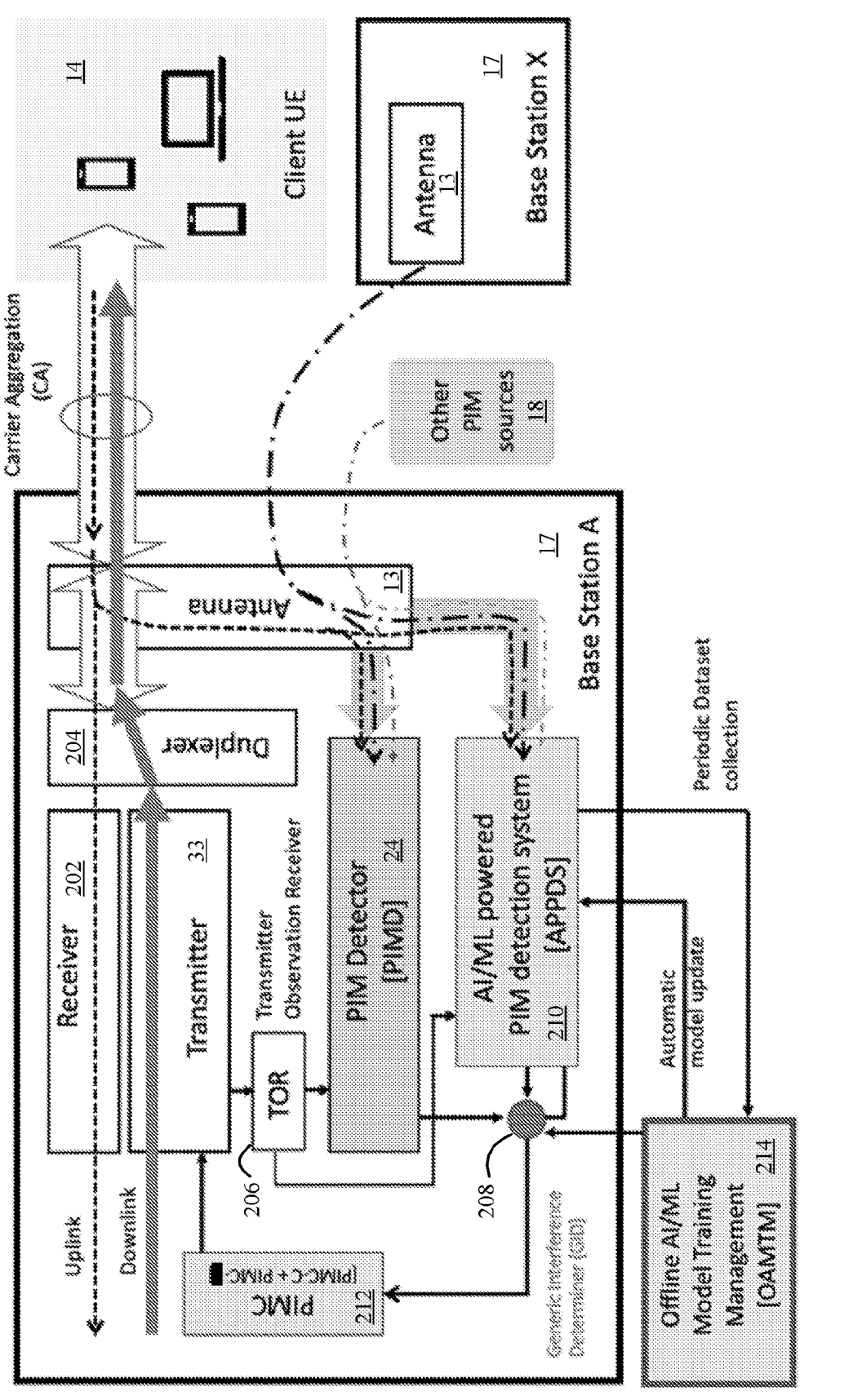
FIG. 2 is a schematic illustration of a system described herein.

It is proposed to add an AI/ML powered PIM detection system (APPDS) component in parallel with the existing PIM detection, as shown in FIG. 2.

In FIG. 2, a Generic Interference Determiner (GID) 208 is introduced to control the final result of the PIM detection that is sent to the PIM corrector (PIMC). A schedule is designed for the GID 208 to take the PIM detection from the traditional or legacy PIM detector (PIMD) 24, from the AI/ML model (APPDS) 210, or from both PIMD 24 and APPDS 210 with a priority setting when detections are received from both PIMD and APPDS at the same time.

With this design, at the beginning, after the installation, it is possible to mostly rely on the traditional model (PIMD)

since the APPDS is not ready and needs more data to train its model and provide accurate PIM detection. After some amount of training is done, the APPDS 210 can be introduced into the system gradually.

In order to support the solution presented in FIG. 2, an Offline AI/ML Model training management (OAMTM) 214 is introduced to do offline model training using the data collected from different base stations across different sites.

A signal is received from a client user equipment (UE) 14, at the base station A 17, through the antenna 13. The signal goes through a duplexer 204 which allows bi-directional communication over a single path and isolates the receiver from the transmitter while permitting them to share a common antenna. From the duplexer, the signal goes to the receiver 202. The signal is also sent from the antenna 13 to the PIM detector 24 and to the AI/ML powered PIM detection system (APPDS) 210. Once PIM is detected for at least one frequency, the PIM detector (PIMD) 24 and/or the APPDS 210 relay this information through the generic interference determiner 208, which forwards the information to the PIM corrector (PIMC) 212. PIMC correct signals to be transmitted which is then directed to the transmitter 33, the duplexer 204 and finally antenna 13. The transmitter observation receiver (TOR) 206 samples the downlink (DL) samples from the transmitter 33 and passes the samples to the model in both PIMD and the APPDS for PIM detection. Those samples from the DL path are input for AI/ML based features extractor 506 (FIG. 5) in the APPDS 210.

Figure 3:
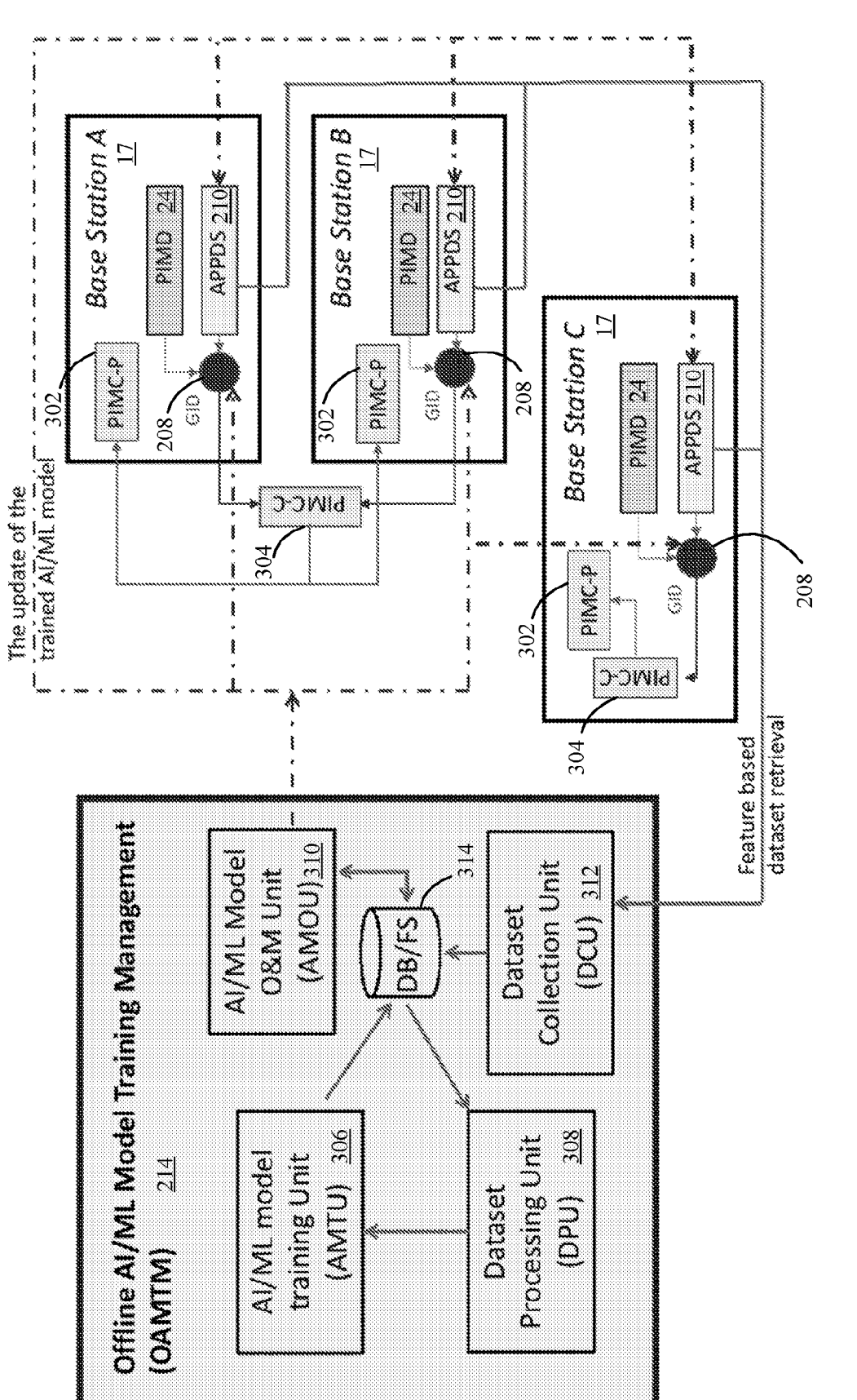
FIG. 3 is a schematic illustration of a system for PIM detection.

Referring to FIG. 3, the OAMTM 214 can be deployed in the cloud and can also be moved around dynamically to get more cost-efficient computational resource to do the offline training. Furthermore, since the dataset used for training the model can be collected from different base stations 17 across different radio sites, the model can be trained more efficiently.

For instance, some PIM scenarios can occur at locations A, B and C, base stations A, B and C 17. The model can capture the PIM detections that occur during the real radio traffic, such as uplink traffic.

Features are extracted from the radio signal and are fed, from the APPDS 210 (once it has started to be used), towards the dataset collection unit (DCU) 312. The outputs corresponding to each feature set (PIM or NO-PIM), can be taken from the APPDS or from the PIMD and are also fed to the DCU. The DCU stores the data to a database/file system (DB/FS) 314. From there the data can be retrieved and processed by the dataset processing unit to prepare the data for the learning stage according to techniques known in the art. This processed data is then fed to the AI/ML model training unit 306 for training. Once the training is done, the model is stored in the DB/FS 314 and can be retrieved by the AI/ML model operation and maintenance (O&M) unit (AMOU). The AMOU can then propagate the model to the different base stations to be used by the local APPDS 210.

If PIM does not occur at each base station, e.g. it occurs only at location A, the model can nevertheless be updated at other locations. Then the model should be able to efficiently detect when PIM occurs at locations other than location A. Many different combinations for model training can be considered, such as training by region, by equipment type, by radio technologies, etc.

Once PIMD 24 or APPDS 210 detects PIM, information is sent to GID 208, which forwards it to the PIM corrector controller PIMC-C 304, which can be inside the base station 17, such as in the case of base station C, or outside the base station (e.g. in the cloud) as in the case of base stations A and B 17. PIMC-C generates information about how the correction to be applied to cancel PIM to the PIMC processor (PIMC-P) 302, which is inside each base station 17.

Figure 4:
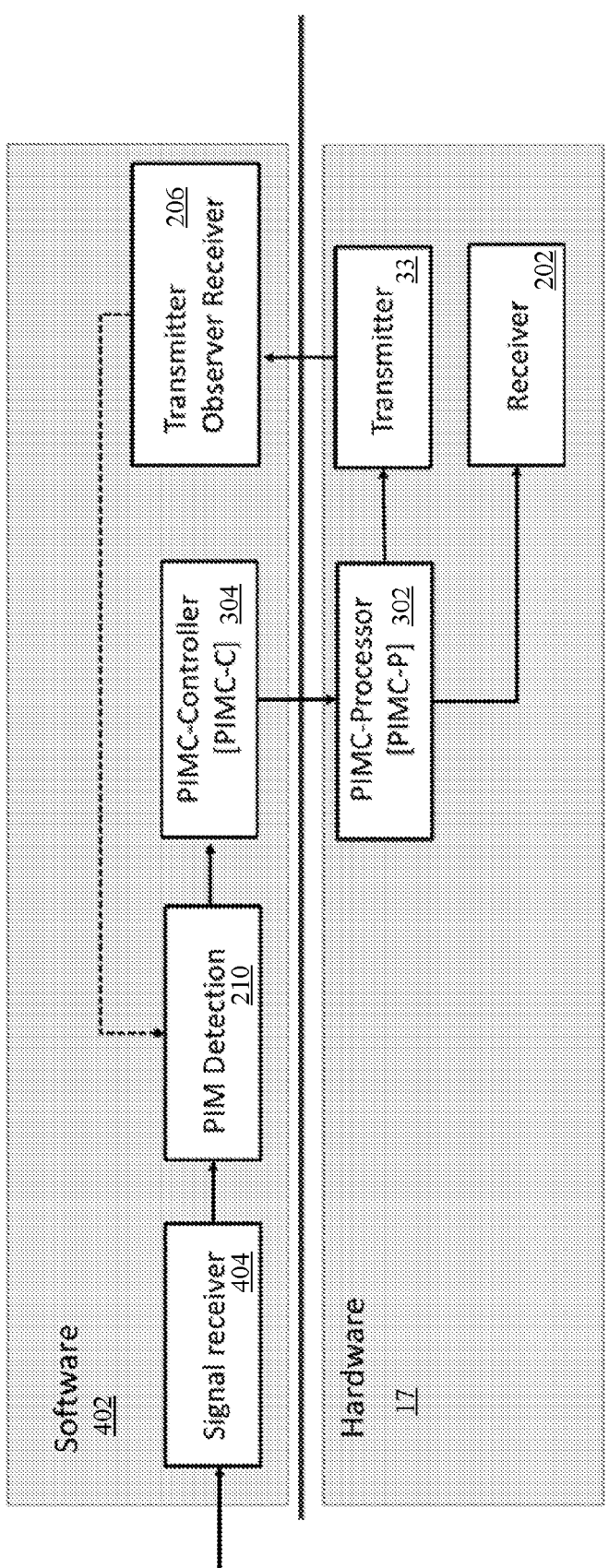
FIG. 4 is a schematic illustration of the system showing the decoupling between PIM corrector controller (PIMC-C) and PIM corrector processor (PIMC-P).

FIG. 4 illustrates how the decoupling between PIMC-C 304 and PIMC-P 302 can be implemented in more details.

In contrast to the traditional single PIMC unit (not illustrated) within a base station 17, the solution described herein also proposed de-coupling the PIMC 212 functionality into PIMC-Controller (PIMC-C) 304 and PIMC-Processor (PIMC-P) 302, as shown in FIG. 4.

Elements in the top part, are software elements that can be implemented in a node different than the base station 17, or in the cloud, and that can be common to many base stations. It comprises a signal receiver 404 that conveys a digital representation of the signal received at the base station(s) 17 towards PIM detection 210. PIM detection can be implemented with an APPDS as explained previously. With this decoupling, one PIMC-C 304 can be shared for multiple base stations, as shown in FIG. 3 in which one PIMC-C 304 is shared between base stations A and B. After receiving the PIM indication from the GID 208, PIMC-C 304 makes the decision on the PIM cancellation algorithm, then instructs the corresponding PIMC-P 302 to perform the detailed logics of the selected PIM cancellation algorithm within a base station. PIMC-C 304 might be deployed within 5G core network since a dedicated network slicing can be given to guarantee the required latency between PIMC-C and PIMC-P.

Once the PIMC-P has corrected the signal for PIM, it can be relayed to the receiver 202 and the transmitter 33. When PIM is detected at the frequencies in the uplink, the model can figure out its corresponding impact on the downlink. The correction made on the downlink side might be considered as feedback to accurately detect PIM on the uplink side.

One advantage to have decoupling of in PIMC as illustrated in FIG. 4, is to allow PIMC-C 304 to be dynamically updated without any impact on the base stations. This framework facilitates any AI/ML model trained for PIM cancellation or avoidance.

The system described herein provides a framework in which the new AI/ML trained PIM detection model can be easily applied to handle traffic in real-time. It provides more accurate PIM detection, which can lead to fully utilizing the capacity of the base stations, efficiently. This also increases the reliability of network operations.

Figure 5:
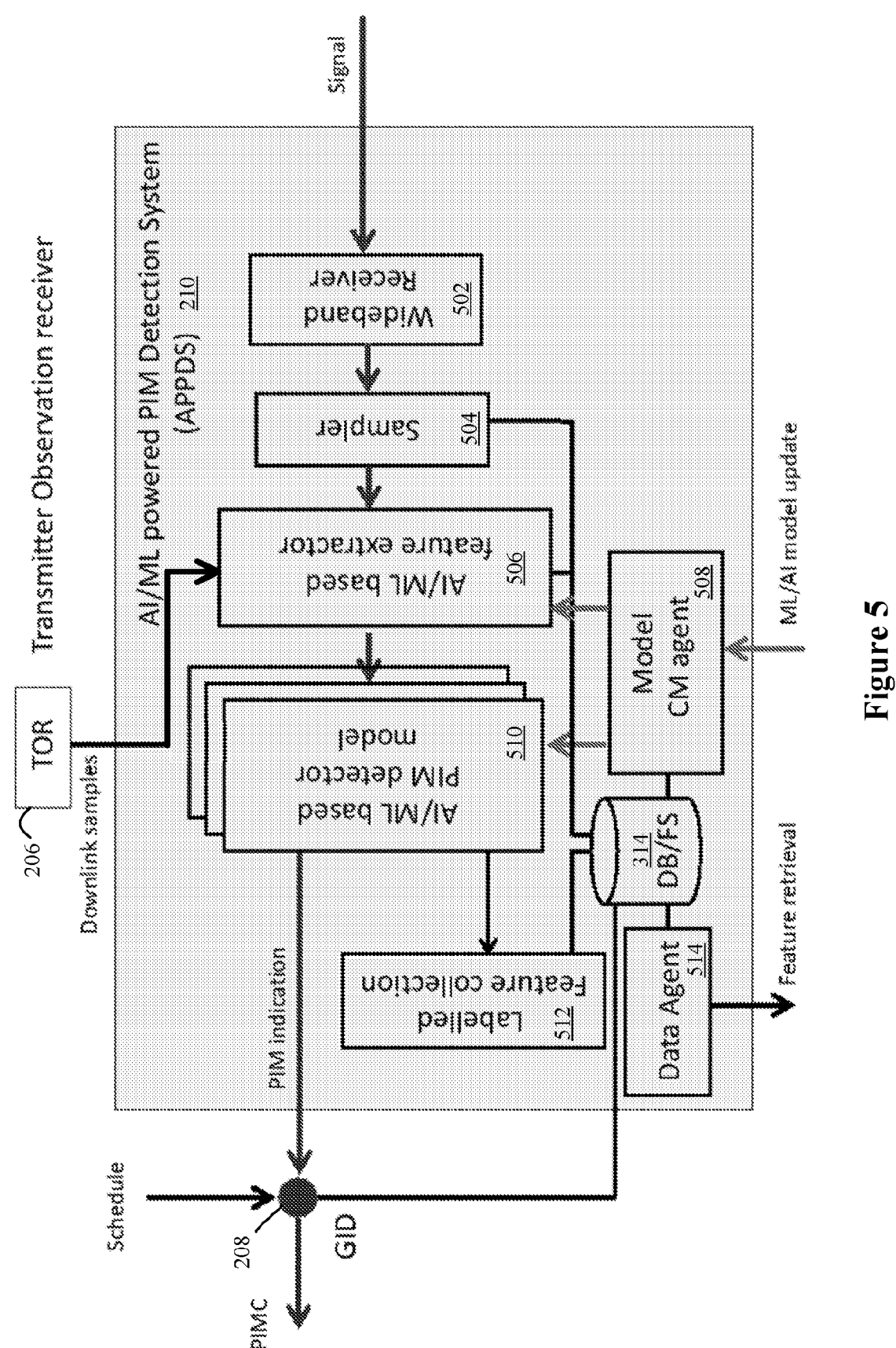
FIG. 5 is a schematic illustration of the component view of the artificial intelligence/machine learning (AI/ML) powered PIM detection system (APPDS).

FIG. 5 is a component view of the AI/ML powered PIM detection system (APPDS) 210. As shown in FIG. 5, the APPDS 210 contains the following components. A wideband receiver 502 which captures wideband signals from the antenna 13 and passes these signals to the sampler 504. The sampler 504 handles the time series data and/or transform the time series data to a frequency data representation using Fourier transform or another transform approach. The sampler 504 forwards this frequency data representation, extracted from the signal, to the AI/ML based feature extractor 506, which extracts the main features from the collected data, such as minimum, maximum, mean, average, medium, standard deviation for the different frequencies, etc. The AI/ML based feature extractor 506 stores those features in the local DB or FS 314. The extracted features are used to build the AI/ML PIM detector Model 510. The model 510 is built by the OAMTM 214, based on the features extracted from the uplink samples from the antenna. The model optionally includes the downlink samples that are provided by the transmitter to the APPDS through the TOR 206. The model 510 produces the output that is provided to the GID 208. The labelled feature collection 512 labels the corresponding features that have been previously stored in DB or FS based on the outcome of the PIM detection. The data agent 514 is responsible for sending the labelled feature data to the OAMTM 214 periodically. The model configuration management (CM) agent 508 is responsible for receiving the model and updating the model according to the schedule in base station.

Figure 6:
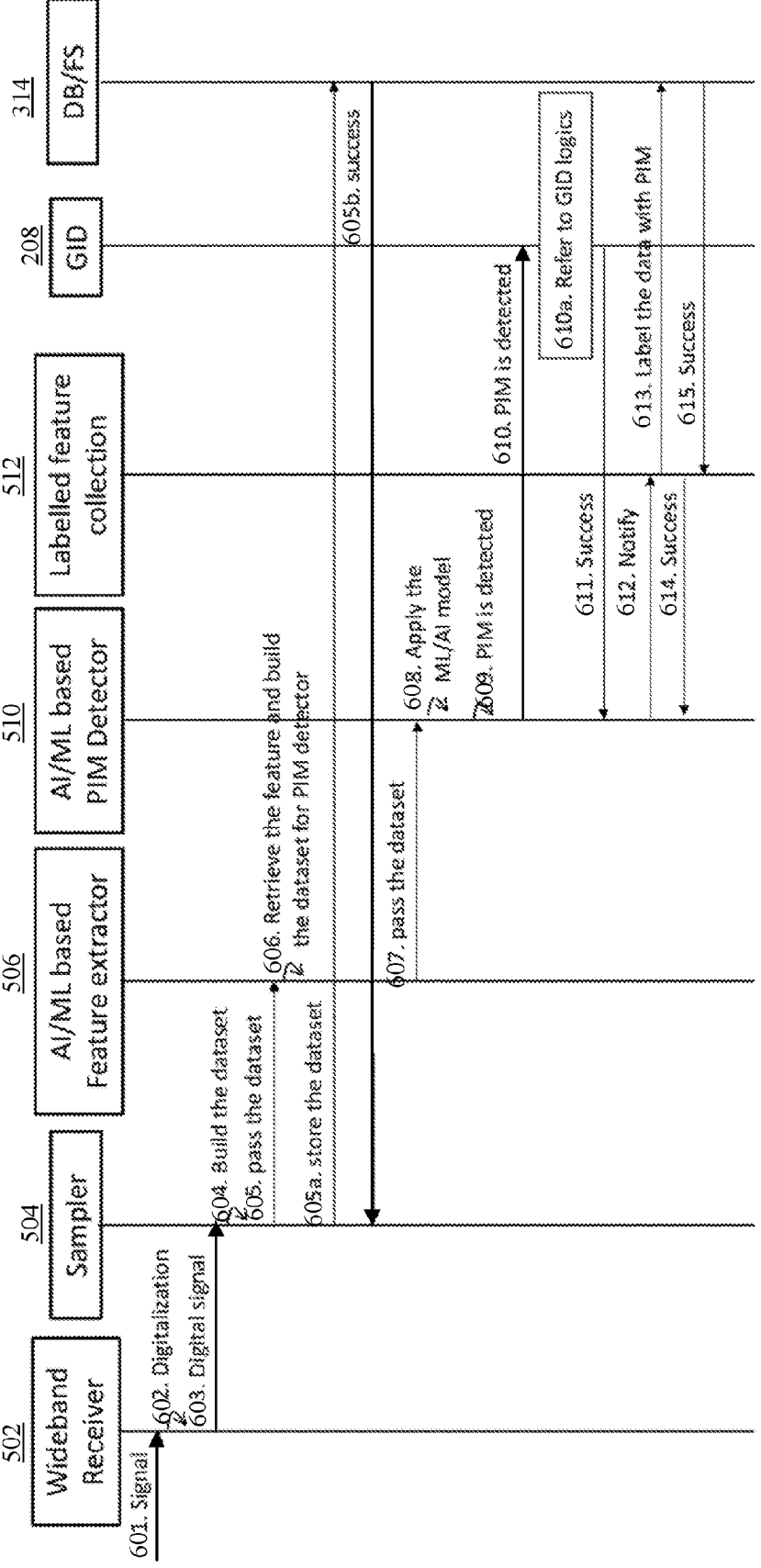
FIG. 6 is a sequence diagram of a traffic flow of PIM detection.

FIG. 6 is a sequence diagram of the traffic flow of PIM detection.

At step 601, the wideband 502 receiver receives a signal. The wideband receiver 502 digitalizes or otherwise transforms the raw signal, step 602. The wideband receiver 502 sends the transformed signal to the sampler 504, step 603. The sampler 504 builds the dataset at step 604, forwards the dataset to the AI/ML based feature extractor 506 at step 605, stores the dataset in the DB/FS 314 at step 605a, and receive an acknowledgement of success at step 605b. The AI/ML based feature extractor 506 retrieves the features and builds a dataset for the PIM detector at step 606 and forwards the dataset to the AI/ML based PIM detector 510 at step 607. The model that has been trained in OAMTM 214 is used by the AI/ML based PIM detector 510, to do PIM detection. The uplink signals are sampled and the corresponding features are retrieved and fed into the trained model. Optionally the model can take into account the downlink samples from TOR. The dataset (samples or features) are store and sent to DCU in OAMTM accordingly.

At step 608, the AI/ML based PIM detector applies the AI/ML model to signals that is received at the base station and PIM may be detected, step 609. At step 610, the AI/ML based PIM detector 510 send a message that PIM is detected to the GID 208. The GID 208 runs the logic, step 610a, that will be detailed in conjunction with FIG. 7 and returns success at step 611. The AI/ML based PIM detector 510 then notifies the labelled feature collection 512 about the PIM and the labelled feature collection 512 labels the data stored in the DB/FS 314 with the PIM, step 613. Notifications of success are returned at steps 614 and 615.

FIG. 7 is a flowchart of the logics that runs in the generic interference determiner 208.

The GID 208 is one of the key components in the proposed solution. It makes the final decision on PIM occurrence based on the input from PIMD 24, APPDS 210 or both of them (PIMD and APPDS). This is realized through a filter designed based on the schedule given in FIG. 7. The schedule 710 can be an hourly based, daily based, weekly based or monthly based schedule and is configurable. Within certain time period, the GID 208 makes a decision based on PIM detection from PIMD 24 only, APPDS 210 only or PIMD and APPDS. In case that both PIMD and APPDS provide the PIM prediction or detection, a priority is applied.

At step 702, the GID 208 receives a PIM indication from either the PIMD 24 or the APPDS 201. The GID 208 logs the PIM detection with the corresponding model (PIMD or APPDS), step 704. The GID filters the PIM indication against the schedule 710, step 706. The GID 208 then sends the PIM indication to PIM cancellation (PIMC) 212, step 708.

In the schedule, time periods when PIM detection should come from PIMD only are indicated, time periods when PIM detection should come from APPDS only are indicated and time periods when PIM detection can come from both PIMD and APPDS are indicated, with ratios to be applied to each measurement/detection to select or determine actual PIM values. The schedule 710 is also designed for handling the AI/ML model update. For instance, in the process of updating the AI/ML model, the corresponding schedule can be set to let GID only take the input from PIMD in order to avoid any service interruption due to the model update in APPDS.

Referring back to FIG. 3, the component Offline AI/ML Model Training Management (OAMTM) 214 is now described in more details.

OAMTM 214 is the management system that trains the offline AI/ML model 510. It contains the DCU 312, DPU 308, AMTU 306 and AMOU 310. It also has a DB or FS 314 to store the dataset, model, schedule for model update, configuration and deployment information. It should be noted that the DB/FS is always referred to with reference number 314, however the different DB/FS described and/or illustrated herein may be different logical components and may be stored on different hardware and/or in different locations.

DCU 312 is responsible for receiving or collecting the dataset (feature based) from the data agent 514 present in different base stations 17. The features extracted from raw data are transferred from the BS 17 to the OAMTM 214 which can be located, or deployed, in any server, data center or private cloud within the operator network. The location for deployment of the OAMTM can be decided based on the capacity of those locations (computational power and storage, as well as bandwidth, etc.). Sending a dataset instead of raw data reduces the network bandwidth usage significantly. It also requires much less time to send the featured related data instead of raw data. This is an important element of the proposed solution to make the AI/ML model work.

DPU 308 is responsible for preparing the dataset to train the model. It includes the cleanup of the dataset and transforming it into a data format that is suitable for the model training.

AMTU 306 is an important component in OAMTM 214. It might be neural network based supervised/unsupervised machine learning or traditional machine learning model. After the training process converges, the trained model will be stored in DB or FS 314. AMTU 306 sends the notification to AMOU 310 about the readiness for the update of the AI/ML model.

AMOU 310 is the component that is responsible for updating the trained model in different base stations 17 at different locations. After receiving the notification about readiness of the updated AI/ML model, AMOU 310 updates the schedule 710 and sends it to the corresponding GID 208. Then AMOU 310 sends the update model to the corresponding model CM agents 508, who eventually execute the model update procedure in each base station 17 according to the schedule 710.

Figure 8:
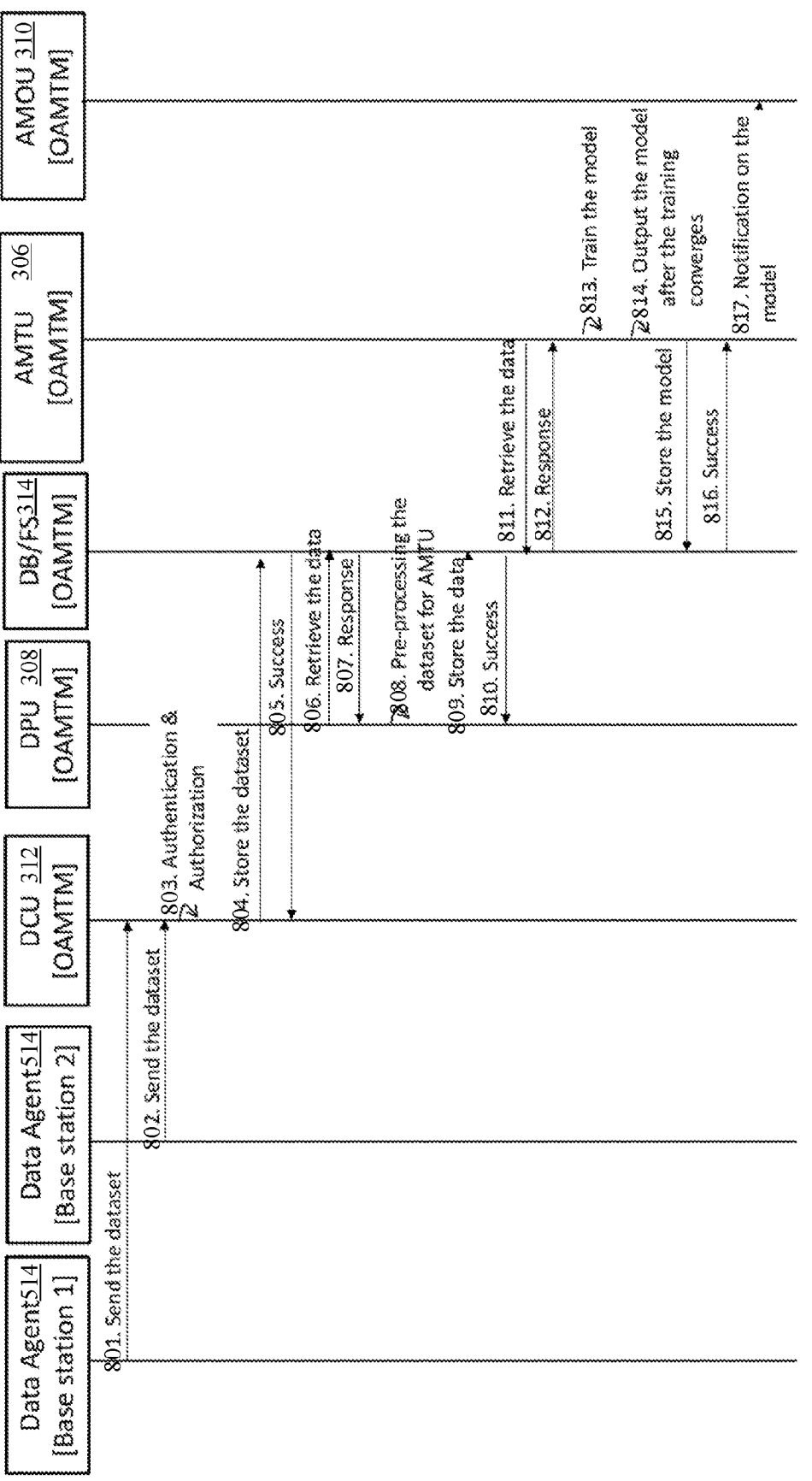
FIG. 8 is a sequence diagram of a data flow from base station (BS) to OAMTM.

FIG. 8 is a sequence diagram illustrating the data flow from two base stations 17 to OAMTM 214.

At step 801, the data agent 514 in BS 1 17 sends the dataset to OAMTM DCU 312. Data agent 514 in BS 2 17 sends the dataset to OAMTM DCU 312, step 802. Data collection unit 312 in OAMTM receives the datasets from both BS1 and BS2 after the authentication and authorization, step 803, are done. Data collection unit 312 in OAMTM stores the received datasets, step 804, in the configured DB or FS 314. Data collection unit 312 receives the confirmation from the DB/FS 314, step 805. Data processing unit 308 in OAMTM fetches the dataset from the DB/FS, step 806. The DB/FS 314 returns the dataset to the data processing unit, step 807. Data processing unit pre-processes the dataset, step 808, for AMTU 306. DPU 308 stores the pre-processed dataset back to DB/FS 314 or the memory buffer, step 809. DPU 308 receives the confirmation about storing the dataset successfully, step 810. AMTU 306 fetches the dataset from DB/FS 314 or the memory buffer, step 811, based on the model to be trained. DB/FS 314 or memory buffer returns the dataset requested, step 812, to the AMTU 306 AMTU 306 trains the model on the retrieved datasets, step 813.

After the training process converges according to given criteria, the AMTU 306 outputs the trained model, step 814. AMTU 306 stores in the DB/FS 314 the trained model to be deployed in the corresponding one or multiple base stations, step 815. AMTU 306 receives the confirmation after the trained model is successfully stored in the memory, step 816 AMTU 306 sends a notification to AMOU 310 on the status of the trained model, step 817, i.e. it is ready for being deployed in the field.

Figure 9:
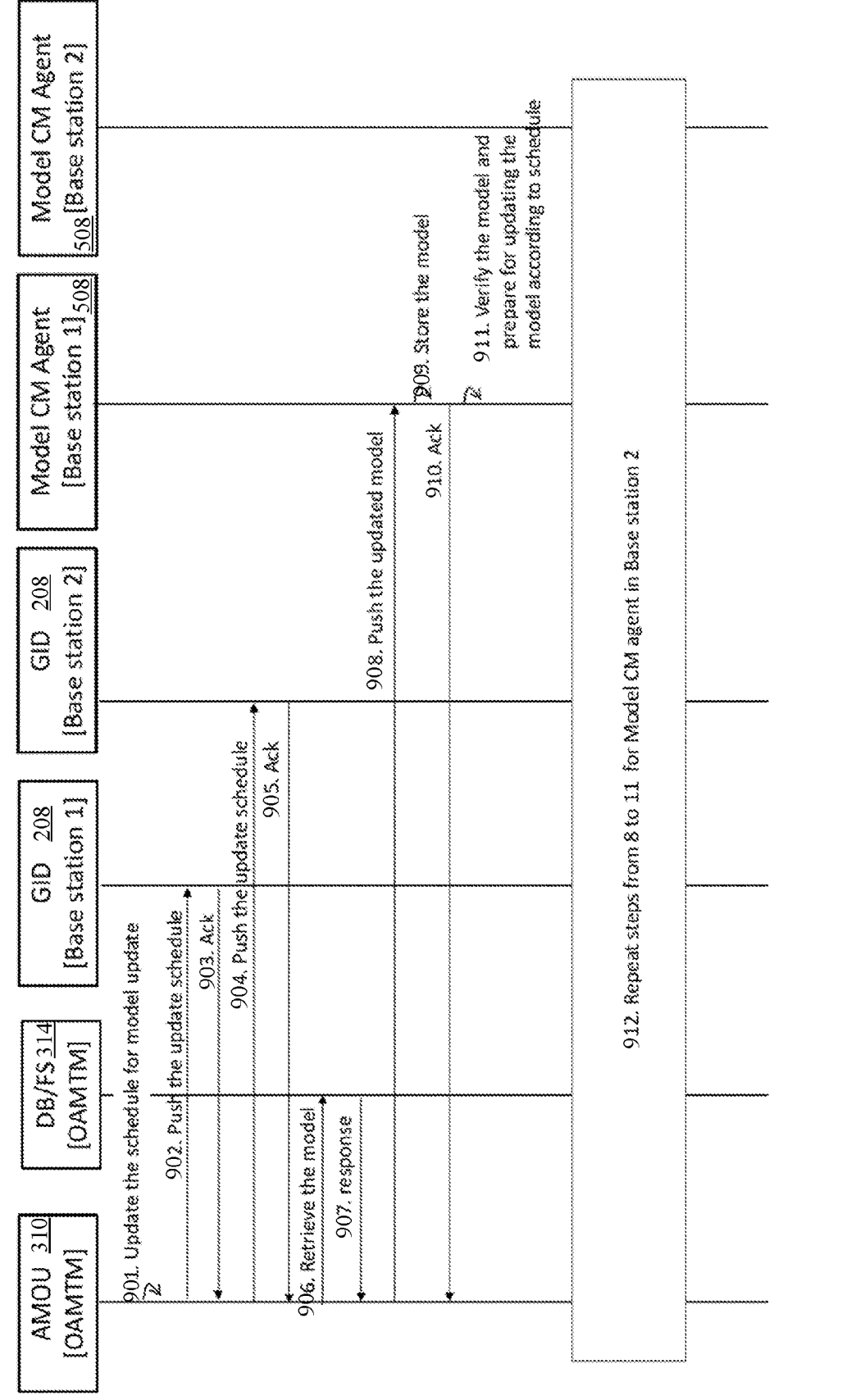
FIG. 9 is a sequence diagram of a model update flow from OAMTM to BS.

FIG. 9 is a sequence diagram illustrating the model update flow from OAMTM to the base stations. After receiving the notification (referring to step 817, in FIG. 8), AMOU 310 in OAMTM updates the schedule 710 for model update, step 901. AMOU 310 pushes the updated schedule to GID 208 in BS 1, step 902. GID 208 in BS 1 sends the acknowledgement back to AMOU 310, step 903. AMOU 310 pushes the updated schedule to GID 208 in BS 2, step 904. It should be noted that this step is done in parallel with step 902. GID 208 in BS 2 sends the acknowledgement back to AMOU 310, step 905. AMOU 310 sends a request to fetch the trained model to DB/FS 314, step 906. AMOU 310 receives the trained model, step 907. AMOU 310 pushes the trained model to model CM agent 508 in base station 1, step 908. It should be noted that the model CM agent might pull the trained model based on the notification from AMOU (this is not shown in the flow). The model CM agent 508 stores the updated model, step 909. Model CM agent 508 sends the acknowledgement to AMOU 310, step 910. Model CM agent 508 verifies the received model and prepare to update the model according to the schedule, step 911.

The schedule is the schedule stored in DB/FS 314, which is set by AMOU 310 in OAMTM. The schedule is sent to GID 208 and GID stores the schedule in DB/FS 314.

AMOU 310 pushes the trained model to the model CM agent 508 in Base station 2 by repeating the steps from 8 to 11, step 912. It should be noted that these steps can be done in parallel for base station 1 and base station 2, or for as many base stations as needed.

Referring to FIG. 10, there is provided a method 1000 for detecting and correcting passive intermodulation (PIM). The method comprises receiving, step 1002, a radio frequency (RF) signal. The method comprises providing, step 1004, the RF signal to a first and a second PIM detectors. The method comprises, upon detection of PIM by at least one of the first and second PIM detectors, for which, based on a schedule, the detection of PIM is applicable at a time of detection of PIM, activating, step 1006, PIM correction.

The RF signal may be received by a base station through an antenna. Activating PIM correction may comprise correcting a new RF signal to be transmitted from the base station through the antenna. The first PIM detector may be a legacy PIM detector (PIMD) and the second PIM detector may be a model-based PIM detector. The model-based PIM detector may comprise a features extractor which extracts features from the RF signal and feeds the features into a trained model for detection of PIM. The features extracted from the RF signal and corresponding PIM or NO-PIM expected outputs may be collected and labeled for training the model. The features extracted from the RF signal may comprise minimum, maximum, average, standard deviation of amplitude and frequency measurements of the RF signal, and PIM or NO-PIM expected outputs may correspond to outputs from the model-based PIM detector or from the PIMD.

The method may further comprise receiving, step 1008, a new model, updated via offline training, and updating the trained model-based PIM detector with the new model. Activating PIM correction may comprise sending a signal to a PIM Corrector (PIMC) Controller (PIMC-C) decoupled from a PIMC Processor (PIMC-P). The PIMC-C and the PIMC-P may not be collocated in a same hardware and PIM correction may be effected by PIMC-C and PIMC-P collectively. One PIMC-C may serve a plurality of base stations. The schedule may define at least one of: a time period when detection of PIM is applicable for the first PIM detector only, a time period when detection of PIM is applicable for the second PIM detector only, and a time period when detection of PIM is applicable for both the first and the second PIM detectors concurrently.

Referring again to FIG. 2, there is provided an apparatus, 17, for detecting and correcting passive intermodulation (PIM). The apparatus comprises processing circuits and a memory, the memory containing instructions executable by the processing circuits whereby the apparatus is operative to receive a radio frequency (RF) signal. The apparatus is operative to provide the RF signal to a first and a second PIM detectors. The apparatus is operative upon detection of PIM by at least one of the first and second PIM detectors, for which, based on a schedule, the detection of PIM is applicable at a time of detection of PIM, to activate PIM correction. The RF signal may be received through an antenna. Activating PIM correction may comprise correcting a new RF signal to be transmitted through the antenna. The first PIM detector may be a legacy PIM detector (PIMD) and the second PIM detector may be a model-based PIM detector. The model-based PIM detector may comprise a features extractor which extracts features from the RF signal and feeds the features into a trained model for detection of PIM The features extracted from the RF signal and corresponding PIM or NO-PIM expected outputs may be collected and labeled for training the model. The features extracted from the RF signal may comprise minimum, maximum, average, standard deviation of amplitude and frequency measurements of the RF signal, and PIM or NO-PIM expected outputs may correspond to outputs from the model-based PIM detector or from the PIMD.

The apparatus is further operative to receive a new model, updated via offline training, and update the trained model-based PIM detector with the new model. Activating PIM correction may comprise sending a signal to a PIM Corrector (PIMC) Controller (PIMC-C) decoupled from a PIMC Processor (PIMC-P). The PIMC-C and the PIMC-P may not be collocated in a same hardware and the PIM correction may be effected by PIMC-C and PIMC-P collectively. One PIMC-C may serve a plurality of apparatuses. The schedule may define at least one of: a time period when detection of PIM is applicable for the first PIM detector only, a time period when detection of PIM is applicable for the second PIM detector only, and a time period when detection of PIM is applicable for both the first and the second PIM detectors concurrently. The apparatus may be a radio base station.

There is provided a non-transitory computer readable media (not illustrated) having stored thereon instructions for detecting and correcting passive intermodulation (PIM). The instructions comprise receiving a radio frequency (RF) signal. The instructions comprise providing the RF signal to a first and a second PIM detectors. The instructions comprise, upon detection of PIM by at least one of the first and second PIM detectors, for which, based on a schedule, the detection of PIM is applicable at a time of detection of PIM, activating PIM correction.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for detecting and correcting passive intermodulation (PIM), comprising:
   receiving a radio frequency (RF) signal;
   providing the RF signal to a legacy PIM detector (PIMD) and a model-based PIM detector, wherein the model-based PIM detector comprises a features extractor which extracts features from the RF signal and feeds the features into a trained model for detection of PIM and wherein the features extracted from the RF signal comprise minimum, maximum, average, standard deviation of amplitude and frequency measurements of the RF signal, and corresponding PIM or NO-PIM expected outputs correspond to outputs from the model-based PIM detector or from the PIMD; and
   upon detection of PIM by at least one of the PIMD and the model-based PIM detector, for which, based on a schedule, the detection of PIM is applicable at a time of detection of PIM, activating PIM correction.

2. The method of claim 1, wherein the RF signal is received by a base station through an antenna.

3. The method of claim 2, wherein activating PIM correction comprises correcting a new RF signal to be transmitted from the base station through the antenna.

4. The method of claim 1, wherein the features extracted from the RF signal, and the corresponding PIM or NO-PIM expected outputs, are collected and labeled for training the model.

5. The method of claim 1, further comprising receiving a new model, updated via offline training, and updating the trained model-based PIM detector with the new model.

6. The method of claim 1, wherein activating PIM correction comprises sending a signal to a PIM Corrector (PIMC) Controller (PIMC-C) decoupled from a PIMC Processor (PIMC-P).

7. The method of claim 6, wherein the PIMC-C and the PIMC-P are not collocated in a same hardware and wherein PIM correction is effected by PIMC-C and PIMC-P collectively.

8. The method of claim 7, wherein one PIMC-C serves a plurality of base stations.

9. The method of claim 1, wherein the schedule defines at least one of:
   a time period when detection of PIM is applicable for the PIMD only,
   a time period when detection of PIM is applicable for the model-based PIM detector only, and
   a time period when detection of PIM is applicable for both the PIMD and the model-based PIM detector concurrently.

10. An apparatus for detecting and correcting passive intermodulation (PIM) comprising processing circuits and a memory, the memory containing instructions executable by the processing circuits whereby the apparatus is operative to:

receive a radio frequency (RF) signal;

provide the RF signal to a legacy PIM detector (PIMD) and a model-based PIM detector, wherein the model-based PIM detector comprises a features extractor which extracts features from the RF signal and feeds the features into a trained model for detection of PIM and wherein the features extracted from the RF signal comprise minimum, maximum, average, standard deviation of amplitude and frequency measurements of the RF signal, and corresponding PIM or NO-PIM expected outputs correspond to outputs from the model-based PIM detector or from the PIMD; and upon detection of PIM by at least one of the PIMD and the model-based PIM detector, for which, based on a schedule, the detection of PIM is applicable at a time of detection of PIM, activate PIM correction.

11. The apparatus of claim 10, wherein the RF signal is received through an antenna.

12. The apparatus of claim 11, wherein activating PIM correction comprises correcting a new RF signal to be transmitted through the antenna.

13. The apparatus of claim 10, wherein the features extracted from the RF signal, and the corresponding PIM or NO-PIM expected outputs, are collected and labeled for training the model.

14. The apparatus of claim 10, further operative to receive a new model, updated via offline training, and update the trained model-based PIM detector with the new model.

15. The apparatus of claim 10, wherein activating PIM correction comprises sending a signal to a PIM Corrector (PIMC) Controller (PIMC-C) decoupled from a PIMC Processor (PIMC-P).

16. The apparatus of claim 15, wherein the PIMC-C and the PIMC-P are not collocated in a same hardware and wherein PIM correction is effected by PIMC-C and PIMC-P collectively.

17. The apparatus of claim 16, wherein one PIMC-C serves a plurality of apparatuses.

18. The apparatus of claim 10, wherein the schedule defines at least one of:

a time period when detection of PIM is applicable for the PIMD only, a time period when detection of PIM is applicable for the model-based PIM detector only, and a time period when detection of PIM is applicable for both the PIMD and the model-based PIM detector concurrently.

19. The apparatus of claim 10, wherein the apparatus is a radio base station.

20. A non-transitory computer readable media having stored thereon instructions for detecting and correcting passive intermodulation (PIM), the instructions comprising:

receiving a radio frequency (RF) signal;

providing the RF signal to a legacy PIM detector (PIMD) and a model-based PIM detector, wherein the model-based PIM detector comprises a features extractor which extracts features from the RF signal and feeds the features into a trained model for detection of PIM and wherein the features extracted from the RF signal comprise minimum, maximum, average, standard deviation of amplitude and frequency measurements of the RF signal, and corresponding PIM or NO-PIM expected outputs correspond to outputs from the model-based PIM detector or from the PIMD; and upon detection of PIM by at least one of the PIMD and the model-based PIM detector, for which, based on a schedule, the detection of PIM is applicable at a time of detection of PIM, activating PIM correction.

\* \* \* \* \*